US009355150B1

(12) United States Patent
Bell et al.

(10) Patent No.: US 9,355,150 B1
(45) Date of Patent: May 31, 2016

(54) CONTENT DATABASE FOR PRODUCING SOLUTION DOCUMENTS

(76) Inventors: Bryan R. Bell, Dallas, TX (US); Steven S. Smith, Charlotte, NC (US); Jim G. Crumpler, Ballarat (AU)

( * ) Notice: Subject to any disclaimer, the term of this patent is extended or adjusted under 35 U.S.C. 154(b) by 262 days.

(21) Appl. No.: 13/534,655

(22) Filed: Jun. 27, 2012

(51) Int. Cl.
G06F 17/30 (2006.01)

(52) U.S. Cl.
CPC .... G06F 17/30522 (2013.01); G06F 17/30312 (2013.01); G06F 17/30371 (2013.01); G06F 17/30554 (2013.01)

(58) Field of Classification Search
CPC .......... G06F 17/3053; G06F 17/30672; G06F 17/30705; G06F 17/30023; G06F 17/3005; G06F 17/30424; G06F 17/30864; G06F 17/30867; G06F 17/30067; G06F 17/301; G06F 17/30206; G06F 17/30979; G06F 17/30; G06F 17/30112; G06F 17/30277; G06F 17/30554; G06F 17/30557; G06F 17/3089; G06F 17/30569; G06F 17/30914
USPC .......................................... 707/602, 736–780
See application file for complete search history.

(56) References Cited

U.S. PATENT DOCUMENTS

| 7,036,079 | B2* | 4/2006 | McGlinchey ......... G06F 9/4446 715/704 |
| 7,774,321 | B2 | 8/2010 | Tomic et al. |
| 8,572,066 | B1 | 10/2013 | Asgeirsson et al. |
| 2002/0129006 | A1 | 9/2002 | Emmett et al. |
| 2007/0185860 | A1 | 8/2007 | Lissack |
| 2007/0292833 | A1* | 12/2007 | Brodie ................ G06F 17/3061 434/350 |
| 2008/0104065 | A1* | 5/2008 | Agarwal ................ G06Q 10/10 |
| 2009/0024587 | A1 | 1/2009 | Kamani et al. |
| 2009/0030882 | A1 | 1/2009 | Wu et al. |
| 2009/0070322 | A1 | 3/2009 | Salvetti et al. |
| 2009/0077114 | A1* | 3/2009 | Zachariah ............. G06F 17/303 |
| 2009/0327343 | A1 | 12/2009 | McCormack et al. |
| 2010/0057677 | A1* | 3/2010 | Rapp ..................... G06F 9/4446 707/E17.014 |
| 2011/0035660 | A1 | 2/2011 | Lussier et al. |
| 2011/0055699 | A1* | 3/2011 | Li et al. ......................... 715/709 |
| 2011/0270900 | A1* | 11/2011 | Sakae ............... G06F 17/30094 707/827 |
| 2013/0076797 | A1 | 3/2013 | Hou |
| 2013/0110813 | A1* | 5/2013 | Holm et al. ................... 707/709 |
| 2013/0124983 | A1 | 5/2013 | Hausig |

OTHER PUBLICATIONS

U.S. Appl. No. 13/534,610, filed Jun. 27, 2012. First Named Inventor: Bryan Bell.

(Continued)

*Primary Examiner* — Michelle Owyang
(74) *Attorney, Agent, or Firm* — Mahamedi Paradice LLP

(57) ABSTRACT

Systems and methods for a content database storing extracted content. A content manager engine executing on a computer system performs various functions in relation to the content database. The content manager engine may extract content fragments from documents of different document types and store the content fragments to content entries of the content database. The content manager engine may reproduce a selected document using the content database, allow direct modification of content entries, and merge two documents of different types into a single document. The content manager engine may also be configured to produce a solution document using the content database based on one or more received user selections. A solution document may be provided to address issues or queries regarding computer system hardware or software. The solution document may comprise a description of any services, products, and/or technologies related to the issue or query.

16 Claims, 13 Drawing Sheets

(56) References Cited

OTHER PUBLICATIONS

Microsoft Computer Dictionary, "Content," fifth edition, 2002, 1 page.
Microsoft Computer Dictionary, "Formatting," fifth edition, 2002, 1 page.
Microsoft Computer Dictionary, "Index," fifth edition, 2002, 1 page.
U.S. Appl. No. 13/534,610, filed Jun. 27, 2012, 75 pages.
Notice of Allowance from U.S. Appl. No. 13/534,610, filed Jun. 27, 2012, mailed Dec. 11, 2015, 11 pages.
Non-Final Office Action from U.S. Appl. No. 13/534,610, filed Jun. 27, 2012, mailed May 22, 2015, 23 pages.
Final Office Action from U.S. Appl. No. 13/534,610, filed Jun. 27, 2012, mailed Dec. 23, 2014, 20 pages.
Non-Final Office Action from U.S. Appl. No. 13/534,610, filed Jun. 27, 2012, mailed Jul. 30, 2014, 18 pages.

* cited by examiner

| Document ID | Content Entries | Attributes |
|---|---|---|
| D1 | E1, E2, E3 | Description:<br>Version #:<br>Timestamp: |
| D2 | E25, E35 | Description:<br>Version #:<br>Timestamp: |
| D3 | E112, E113, E114, E85 | Description:<br>Version #:<br>Timestamp: |
| ... | | |

FIG. 5

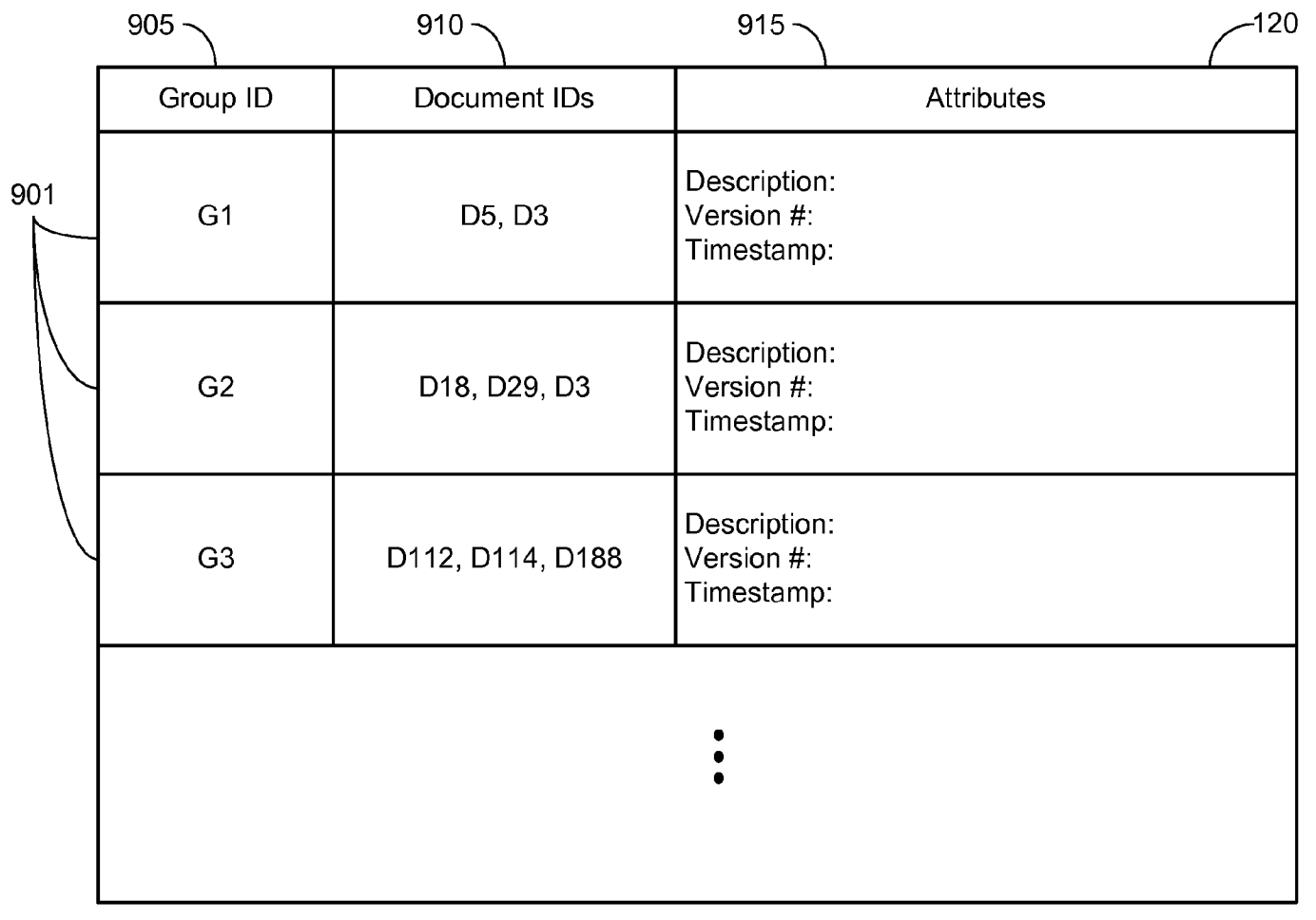

| Group ID | Document IDs | Attributes | 120 |
|---|---|---|---|
| G1 | D5, D3 | Description:<br>Version #:<br>Timestamp: | |
| G2 | D18, D29, D3 | Description:<br>Version #:<br>Timestamp: | |
| G3 | D112, D114, D188 | Description:<br>Version #:<br>Timestamp: | |
| ... | | | |

FIG. 9

| Selections/ Parameters | Mapping IDs | Attributes | |
|---|---|---|---|
| S1 | D15, G1, D82 | Description:<br>Version #:<br>Timestamp: | |
| S1, S2 | G11, D2, D3 | Description:<br>Version #:<br>Timestamp: | |
| S1, S2, S3 | D15, G8 | Description:<br>Version #:<br>Timestamp: | |
| ... | | | |

FIG. 11

CONTENT DATABASE FOR PRODUCING SOLUTION DOCUMENTS

FIELD OF THE INVENTION

The present invention relates to storage systems and, more specifically, to a content database for storing extracted content.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to organize the information stored on volumes as a hierarchical structure of storage objects, such as files. The storage system may be further configured to allow many servers to access storage objects stored on the storage system. In this model, the server may execute an application that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected to provide a storage system architecture configured to service many servers. In some embodiments, the storage system architecture provides one or more aggregates, each aggregate comprising a set of one or more storage devices (e.g., disks). Each aggregate may store one or more storage objects, such as one or more volumes. The aggregates may be distributed across a plurality of storage systems interconnected as a cluster. The storage objects (e.g., volumes) may be configured to store content of storage objects, such as files, served by the cluster in response to multi-protocol data access requests issued by servers.

Each storage system (node) of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each storage system is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The storage systems of the cluster may be configured to communicate with one another to act collectively to increase performance or to offset any single storage system failure within the cluster. The cluster provides data service to servers by providing access to a shared storage (comprising a set of storage devices). Typically, servers will connect with a storage system of the cluster for data-access sessions with the storage system. During a data-access session with a storage system, a server may submit access requests (read/write requests) that are received and performed by the storage system. Each server typically executes numerous applications requiring the data services of the cluster.

As discussed above, the storage operating system of the storage system may implement a file system for storing a plurality of storage objects, such as computer files. These files (or "documents") may be produced by a wide variety of different types of document applications, such as a word processor, spreadsheet application, presentation application, image application, etc. Currently, there are also many different types of formats for each type of document application. As such, the storage system may store a plurality of different document types (that are in a plurality of different types of formats and compatible with a plurality of different types of applications). This may be problematic when attempting to access the content in the different document types on the storage system. Typically, in order to access the content of different document types, each application corresponding to each document type would need to be installed and available for accessing the content. As such, there is a need for a more accessible method for storing documents on a storage system.

Another issue with current storage systems is the inefficient manner for modifying related documents stored on the storage system. For example, assume that a large number of documents each relate to a particular technology. If the particular technology has been updated, to update the documents accordingly, each of the documents would need to be individually accessed, modified, and saved to the file system. This is due to the fact that the documents are stored as independent files on the file system, each document having no connection or relationship to the other. Such an update process may consume large amounts of time and computer and human resources. As such, there is a need for a more efficient method for modifying related documents on a storage system.

Finally, another issue with current storage systems is the inefficient manner used for providing solution documents for clients/users of the storage systems for any issues or queries regarding storage system hardware and/or software the clients/users may have. The solution document may provide a description of how to resolve the client's issue or query. Typically, to provide a solution document to the client, an administrator or engineer is needed to interact with the client to determine their issue or query, determine any storage system services, products, and/or technologies related to the issue or query, identify any documents in the storage system describing these services, products, and/or technologies, modify any of the documents if any of the corresponding services, products, and/or technologies has been recently updated, and produce a solution document for the client that includes the description of the related services, products, and/or technologies. Given that a large number of issues or queries may be received by clients, such a solution process for each issue or query may collectively consume large amounts of time and computer and human resources. As such, there is a need for a more efficient method for providing solution documents for the clients/users.

SUMMARY OF THE INVENTION

Systems and methods for a content database storing extracted content are described herein. A content manager engine executing on a computer system may be configured to perform various functions in relation to the content database. In some embodiments, the content manager engine is configured to process documents of different document types to produce content entries in the content database. The content manager engine may be further configured to reproduce a selected document using the content database, to directly modify content entries in the content database, merge two documents of different types into a single document, and produce solution documents.

The content manager engine may be configured to process documents of different document types by extracting content of the documents and storing the content to the content database as content entries. A plurality of documents may be processed to populate the content entries of the content database. The plurality of processed documents may comprise a plurality of different document types in any format. As such, the content database provides a repository of extracted/deconstructed content that is accessible to users without requiring installation and use of the wide variety of document applications that would otherwise be needed to access the different document types.

The content manager engine may also be configured to produce a new document based on a document mapping associated with an original selected document. The new document comprises a deconstructed version of the original selected document, without the metadata or formatting of the original selected document. The new document may also be modified by the user and saved as a document file to a file system. The content manager engine may be further configured to merge two documents of different types into a single document by extracting content of the two documents, storing the content to the content database as content entries, and inserting the content into a new document. In some embodiments, the content manager engine may also be configured to allow direct modification of content fragments in content entries of the content database. In these embodiments, modifying a content entry provides automatic updating/modifying of any document mapping, group mapping, or solution mapping using the modified content entry and any subsequent document produced using the modified content entry.

In some embodiments, a group mapping may be produced to group two or more related document mappings that are associated with two or more related documents. As such, the group mapping may map to two or more related document mappings that are associated with the content of two or more related documents. As such, a group mapping may represent (and map to) content for an overall topic, such as a particular storage system service, product, and/or technology. Each document mapping specified in a group mapping may represent (and map to) content for a particular sub-topic of the overall topic. It may be convenient to group such related content, and their corresponding document mappings, as a group mapping. One or more group mappings may be stored to a group mapping DS.

In some embodiments, the content manager engine may be configured to produce a solution document using the content database. The solution document may be produced based on one or more received user selections. In some embodiments, a solution document may be provided for clients/users for issues or queries regarding computer systems, such as computer hardware and/or software, storage system hardware and/or software, etc. For example, the solution document may comprise a description of any computer system services, products, and/or technologies related to the client's issue or query, and may also contain any execution steps (such as installation steps, configuring steps, etc.) needed to implement the related services, products, and/or technologies. The solution document may include various types of content, such as text, images (e.g., illustrations, diagrams, flowcharts, etc.), presentation slides, etc.

In some embodiments, a solution document is produced using a solution mapping. A solution mapping may map one or more received user selections to one or more document mappings and/or one or more group mappings. The document and/or group mappings will then map to content entries in the content database having content fragments relevant to the received user selections. The content fragments comprise a solution document that is related to the user's issue or query. A plurality of solution mappings may be produced to map a wide variety of different user selections and different combinations of user selections to document and/or group mappings. The solution mappings are stored to a solution mapping data structure.

BRIEF DESCRIPTION OF THE DRAWINGS

The novel features are set forth in the appended claims. However, for purpose of explanation, several embodiments of the invention are set forth in the following figures.

FIG. 5 shows a conceptual diagram of an exemplary document mapping DS;

FIG. 9 shows a conceptual diagram of an exemplary group mapping DS;

FIG. 11 shows a conceptual diagram of an exemplary solution mapping DS;

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order to not obscure the description with unnecessary detail.

The description that follows is divided into three sections. Section I describes a storage system environment in which some embodiments operate. Section II describes a content database for storing extracted content. Section III describes producing solution documents using the content database.

I. Storage System Environment

A. Overview

Figure 1:
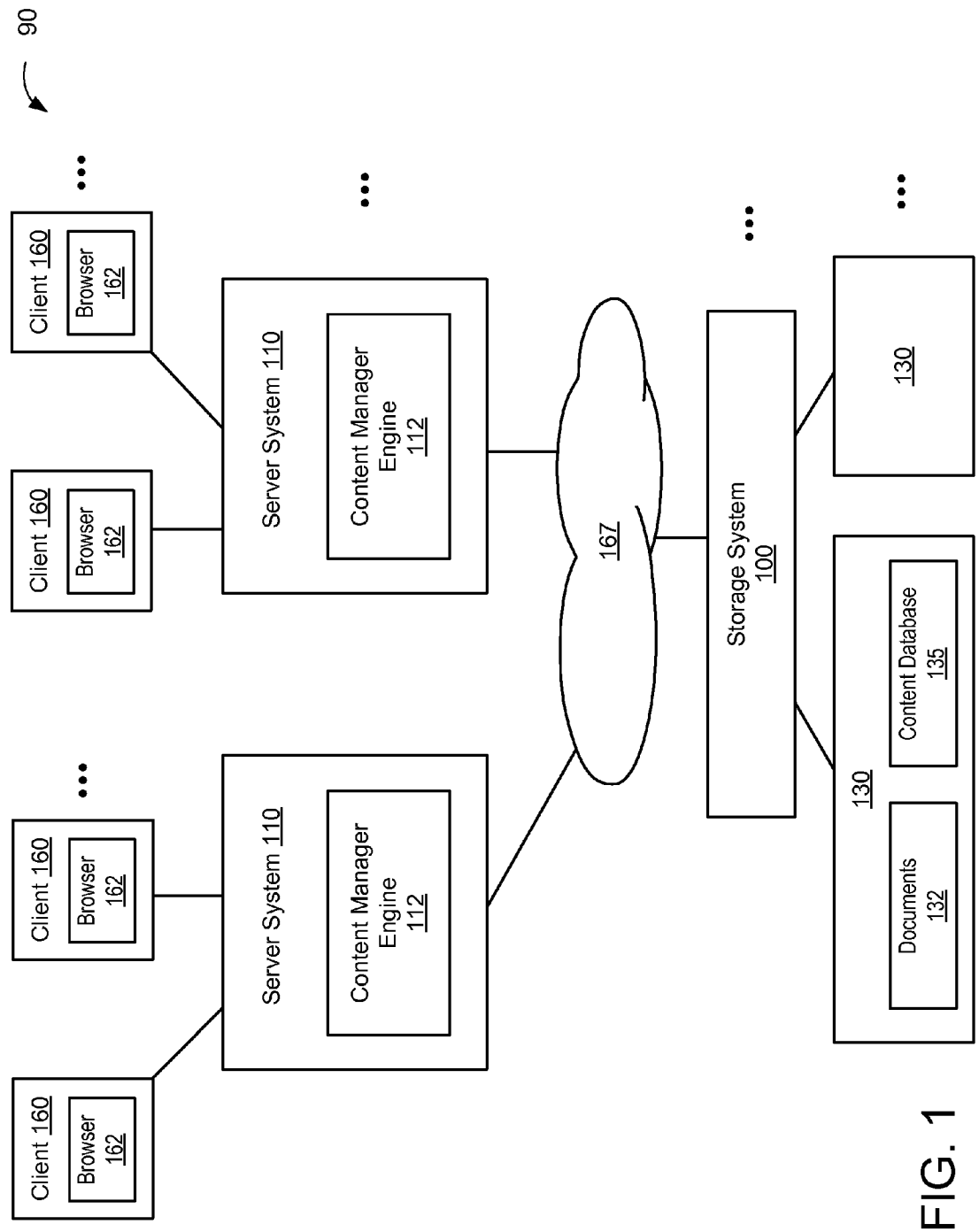
FIG. 1 is a block diagram of an exemplary storage system environment in which some embodiments operate.

FIG. 1 is a block diagram of an exemplary storage system environment 90 in which some embodiments operate. The environment 90 comprises one or more server systems 110 that may each access one or more storage systems 100 that are coupled to the server systems 110 via a network 167. The one or more storage systems 100 may comprise a cluster storage system. Each storage system 100 may comprise one or more storage devices 130 for storing data, the storage devices 130 comprising a shared storage of the storage system 100.

A server system 110 may be general-purpose computers configured to execute applications over a variety of operating systems, including the UNIX® and Microsoft Windows® operating systems. Server systems generally utilize file-based access protocols when accessing information (in the form of files and directories) over a NAS-based network. Therefore, each server 110 may request the services of the storage system 100 by issuing file access protocol messages (in the form of packets) to the storage system over the network 167. For example, a server running the Windows operating system may communicate with the storage system 100 using the Common Internet File System (CIFS) protocol. On the other hand, a server running the UNIX operating system may communicate with the multi-protocol storage system using the Network File System (NFS) protocol over TCP/IP. It will be apparent to those skilled in the art that other servers running other types of operating systems may also communicate with the integrated multi-protocol storage system using other file access protocols.

A server system 110 may comprise a computer system that may execute a content manager engine 112 for performing embodiments described herein. The content manager engine 112 may utilize data services of the storage system 100 to access, store, and manage data in the storage devices 130, such as document files 132 and a content database 135. The content manager engine 112 may submit access requests for accessing particular storage objects on the storage devices, such as the document files 132 and the content database 135 and the storage system may perform the received requests on the storage objects.

A storage system 100 may be coupled to a server system 110 over a network 167 such as a local area network (LAN), an Ethernet subnet, a PCI or PCIe subnet, a switched PCIe subnet, a wide area network (WAN), a metropolitan area network (MAN), the Internet, or the like. To facilitate access to the disks 130, a storage operating system of the storage system implements a file system of a virtualization system that "virtualizes" the storage space provided by disks 130. The file system organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored.

In the illustrative embodiment, the storage operating system may comprise Data ONTAP® storage operating system, available from NetApp, Inc. of Sunnyvale, Calif., which implements a Write Anywhere File Layout (WAFL®) file system. However, it is expressly contemplated that any appropriate storage operating system, including a write in-place file system, may be enhanced for use in accordance with embodiments described herein. As such, where the term "WAFL" is employed, it should be taken broadly to refer to any storage operating system that is otherwise adaptable to the teachings of this embodiment.

As used herein, the term "storage operating system" generally refers to the computer-executable code operable on a computer that manages data access and may, in the case of a multi-protocol storage system, implement data access semantics, such as the Data ONTAP® storage operating system, which is implemented as a microkernel. The storage operating system can also be implemented as an application program operating over a general-purpose operating system, such as UNIX® or Windows®, or as a general-purpose operating system with configurable functionality, which is configured for storage applications as described herein.

Interaction between the server systems 110 and the storage system(s) 100 can enable the provision of storage services. That is, the server systems 110 may request the services of the storage system(s) 100 (by submitting read/write access requests), and the storage system(s) 100 may respond to read/write access requests of the server systems 110 by receiving or transmitting data to the server systems 110 over the network 167 (e.g., by exchanging data packets through a connection over the network 167).

Communications between a storage system 100 and any of server systems 110 are typically embodied as packets sent over the computer network 167. A server system 110 may send an access request (a read/write access request) to the storage system 100 for accessing particular data stored on the storage system. The server system 110 may request the services of the storage system 100 by issuing storage-access protocol messages formatted in accordance with a conventional storage-access protocol for accessing storage devices (such as CIFS, NFS, etc.). Access requests (e.g., read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the server system 110 may issue access requests by issuing packets using block-based access protocols—such as the Fibre Channel Protocol (FCP), or Internet Small Computer System Interface (iSCSI) Storage Area Network (SAN) access—when accessing data in the form of blocks.

A storage device 130 may comprise writable storage device media such as disk devices, video tape, optical devices, DVD, magnetic tape, flash memory, Magnetic Random Access Memory (MRAM), Phase Change RAM (PRAM), or any other similar media adapted to store information (including data and parity information). As known in the art, a storage device 130 may comprise storage objects comprising, for example, one or more storage volumes, where each volume has a file system implemented on the volume. A file system implemented on the storage devices 130 may provide multiple directories in a single volume, each directory containing zero or more filenames. A file system provides a representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like.

In some embodiments, the storage devices 130 of a storage system 100 store a plurality of documents 132 comprising a plurality of different document types, and a content database 135 comprising a plurality of content entries. In an alternative embodiment, the documents 132 and the content database 135 may be stored locally on a server system 110 and/or client system 160.

The documents 132 may comprise computer files produced by a wide variety of different types of document applications, such as a word processor/application, spreadsheet application, presentation application, image application, etc. Currently, there are also many different types of formats for each type of document application. For example, the different types of formats for a word application include Microsoft® Word® (DOC), Corel® WordPerfect® (WPD), AbiSource® Abiword® (ABW), etc. As such, the documents 132 may comprise a plurality of different document types that are in a plurality of different types of formats and compatible with a plurality of different types of applications. This may be problematic when attempting to access the content in the different document types on the storage system. Typically, in order to access the content of different document types, each application corresponding to each document type would need to be installed and available for accessing the content.

As used herein, a document type of a document is determined by the format type of the document. The document type of a document may be determined by the format type implemented by the application that produces the document. As known in the art, a file/document is not an executable file, but rather contains data for use by the corresponding application. As known in the art, a file/document is organized and stored in a file system of the storage operating system.

As used herein, an "original" document comprises a document produced by a document application, the original document containing content as well as metadata and formatting produced by the document application. In some embodiments, the content manager engine 112 extracts content of original documents by removing the metadata and formatting of the original documents. As used herein, a "deconstructed" document comprises a document produced by the content manager engine 112, the deconstructed document containing only the content of an original document. As such, a deconstructed document comprises a deconstructed version of an original document without the metadata or formatting of the original document.

In some embodiments, one or more storage devices 130 of a storage system 100 store a content database 135 comprising a plurality of content entries. The content database 135 may comprise a collection of data or information organized for rapid search and retrieval by a computer system, for example, using structured query language (SQL), etc. The content database 135 may be structured to provide storage, retrieval, modification, and/or deletion of data in the content entries. Data of the content entries may be retrieved through queries. For example, keywords and sorting commands may be used to search, organize, and select data of the content entries. Some examples of different types of databases that may be implemented herein include document-oriented database, data driven database, embedded database, federated database, cloud database, data warehouse database, relational database, transactional database, distributed database, etc. In other embodiments, other types of databases may be implemented herein. In some embodiments, the content database 135 and its content entries are separate from the file system, wherein the content database 135 and the content entries are organized and stored outside the file system and without use of the file system.

As shown in FIG. 1, the storage system environment 90 may also include a plurality of client systems 160 connected with each server 110 through a network (not shown), such as network 167. In some embodiments, a user of a client system may submit, to the content manager engine 112, one or more selections/parameters for specifying an issue/problem or a query, for example, regarding computer systems, such as computer hardware and/or software, storage system hardware and/or software, etc. The terms "user" and "client system" may sometimes be used interchangeably herein. The content manager engine 112 may provide a user interface for displaying the one or more user-selectable selections/parameters and for receiving the selections from the client system/user. In these embodiments, the content manager engine 112 may use the content database 135 to provide a solution document based on the one or more selections/parameters received from the client system/user.

In some embodiments, each client system 160 may execute a web browser 162 for interfacing/interacting with a server 110 via the network. The web browser 162 on the client system 160 may interface/interact the content manager engine 112 on the server 110 for performing embodiments described herein. In these embodiments, the web browser 162 may be used to receive and display the user interface from the content manager engine 112, receive one or more selections from the user, and submit the one or more selections/parameters to the content manager engine 112. The content manager engine 112 may send the solution document to the client system 160 via a file download, which may be stored to a local storage device of the client system 160. In other embodiments, the content manager engine 112 may send the solution document to the client system 160 via a web-based format (such as HyperText Markup Language (HTML), EXtensible Markup Language (XML), etc.) which may be displayed on the web browser 162 without requiring a file download. In these embodiments, a client system would only require a web browser 162 to access the functions of the content manager engine 112, without having to locally install and execute the content manager engine 112 on the client system.

Figure 2:
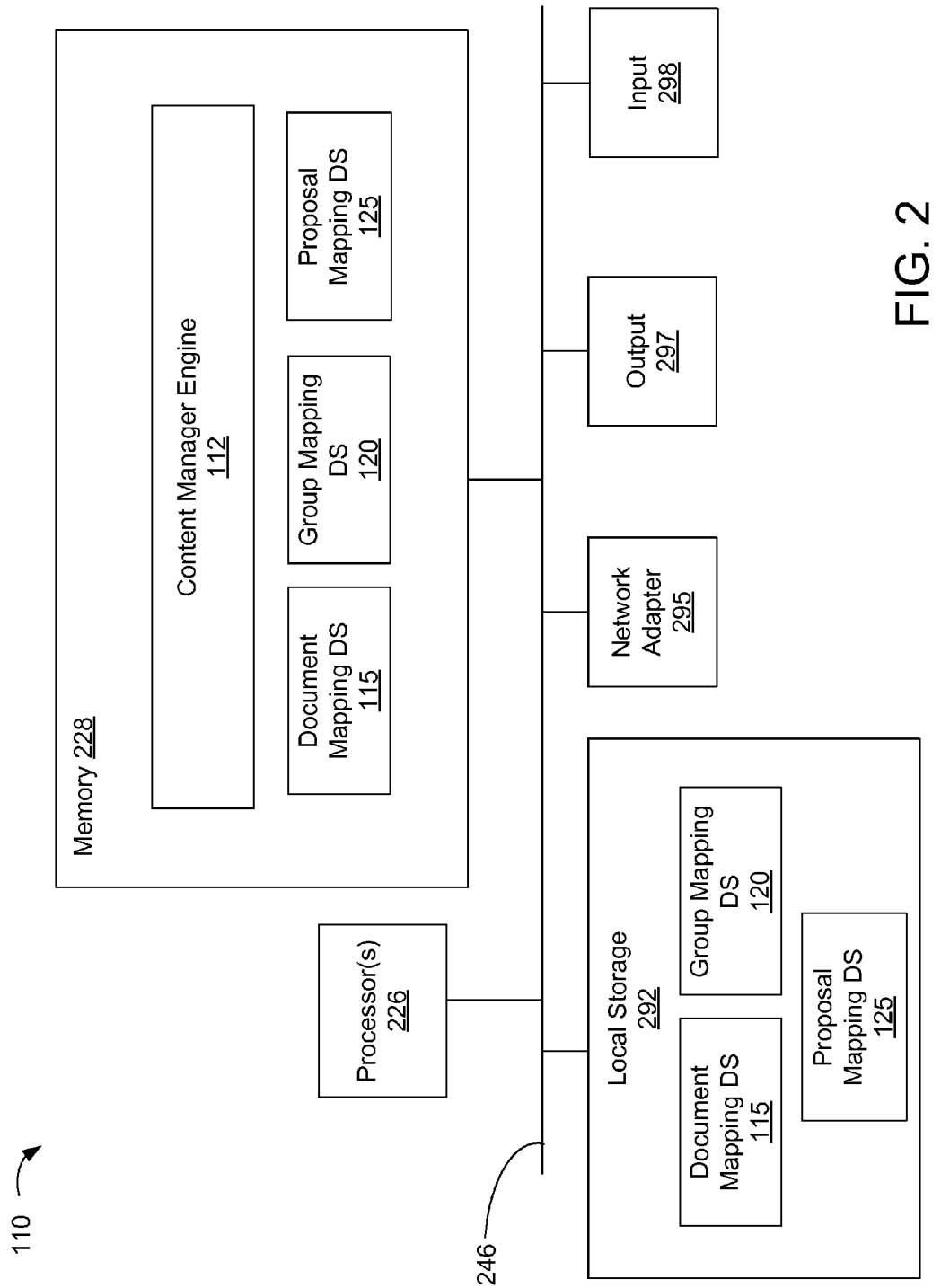
FIG. 2 is a schematic block diagram of an exemplary server system that may be employed in the storage system environment of FIG. 1.

FIG. 2 is a schematic block diagram of an exemplary server system 110 that may be employed in the storage system environment 90 of FIG. 1. The exemplary server system 110 may comprise processor(s) 226, memory 228, a local storage 292, a network adapter 295, an output component 297, and an input component 298 coupled by a bus 246.

The processors 226 are the central processing units (CPUs) of the server system 110 and, thus, control the overall operation of the server system 110. Processors 226 may include one or more programmable general-purpose or special-purpose microprocessors, digital signal processors (DSPs), programmable controllers, application specific integrated circuits (ASICs), programmable logic devices (PLDs), or the like, or a combination of such devices.

The network adapter 295 may comprise mechanical, electrical, and signaling circuitry needed to connect the server system 110 to the network and to receive and transmit data over the network. The network adapter 295 comprises a plurality of ports adapted to couple the server system 110 to one or more other computer systems (such as servers 110 or storage systems 100) over point-to-point links, wide area networks, virtual private networks implemented over a public network (Internet) or a shared local area network. The network adapter 295 thus may comprise the mechanical, electrical and signaling circuitry needed to connect the server system 110 to the network. The network adapter 295 may comprise a network port controller (e.g., Ethernet cards), specialized network adapters, or any other physical device that controls the receiving and transmitting of data over a network.

The output component 297 may be of any type generally used by a computer system to provide information to an end user (e.g., administrator, etc.). For example, the output component 297 may include a monitor, an audio speaker, or an alphanumeric display. Similarly, the input component 298 may be of any type that allows an end user to provide input (e.g., user selections) into a computer system. For example, the input component 298 may be a keyboard, a mouse, or a speech recognition system. In some embodiments, the output component 297 comprises a monitor or television that displays a user interface provided by the content manager engine 112. In some embodiments, the input component 298 may be used by a user (e.g., administrator) for interacting with and providing input to the user interface of the content manager engine 112.

Memory 228 comprises storage locations that are addressable by the processor and adapters, as well as other devices for storing software program code such as the software described herein. The processors and adapters may, in turn, comprise processing elements and/or logic circuitry configured to execute the software code. Memory 228 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

Memory 228 is for storing software program instructions and data structures, such as an operating system and a content manager module 112. The operating system may be, for example, UNIX®, Windows NT®, Linux®, or any other operating system. In some embodiments, the various modules may configure hardware components of the server system to produce a content manager engine 112 for performing embodiments described herein. The server memory 228 may also store various data structures (DSs), such as a document mapping DS 115, a group mapping DS 120, and a solution mapping DS 125, that are used by the content manager engine 112 for performing embodiments described herein.

Local storage 292 may comprise a local writable storage device, such as disk devices, video tape, optical devices, DVD, magnetic tape, flash memory, Magnetic Random Access Memory (MRAM), Phase Change RAM (PRAM), or any other similar media adapted to store information (including data and parity information). Local storage 292 is a storage device that stores data needed or produced by the content manager module 112 when performing the embodiments described herein. For example, such data may include the document mapping DS 115, the group mapping DS 120, and the solution mapping DS 125. The server system 110 loads data stored on the local storage 292 into memory 228 from which they are accessed by processors 226.

In some embodiments, the content manager engine 112 is configured to use the document mapping DS 115, group mapping DS 120, and solution mapping DS 125 for performing various functions described herein. For example, such functions may include managing the content database 135, extracting content from documents and storing the extracted content to the content database 135, merging two documents of different types into a single document, and producing solution documents for clients/users. The content database 135 may also provide a user interface for facilitating the various functions.

Note that a client system 160 may also comprise components similar to the components of the server 110 illustrated in FIG. 2. For example, a client system 160 may comprise one or more processor(s) 226, memory 228, a local storage 292, a network adapter 295, an output component 297, and an input component 298 coupled by a bus 246. The components of the client system 160 may be used to interact/interface with the content manager engine 112 in accordance with embodiments herein. For example, the components of the client system 160 may be used to execute the web browser 162 to interact/interface with the content manager engine 112.

II. Content Database for Storing Extracted Content

This section discusses systems and methods for a content database storing extracted content. The content manager engine 112 may be configured to perform various functions in this regard. In some embodiments, the content manager engine 112 may be configured to process documents of different document types to produce content entries in the content database 135. The content manager engine 112 may be further configured to reproduce a selected document using the content database 135, to directly modify content entries in the content database 135, and merge two documents of different types into a single document.

A. Extracting Content of Documents and Storing to Content Database

The content manager engine 112 may be configured to process documents of different document types by extracting content of the documents and storing the content to the content database 135 as content entries. The content manager engine 112 may provide a user interface to facilitate the processing of documents, the user interface for displaying screen pages and receiving input from a user (such as an administrator).

Figure 3:
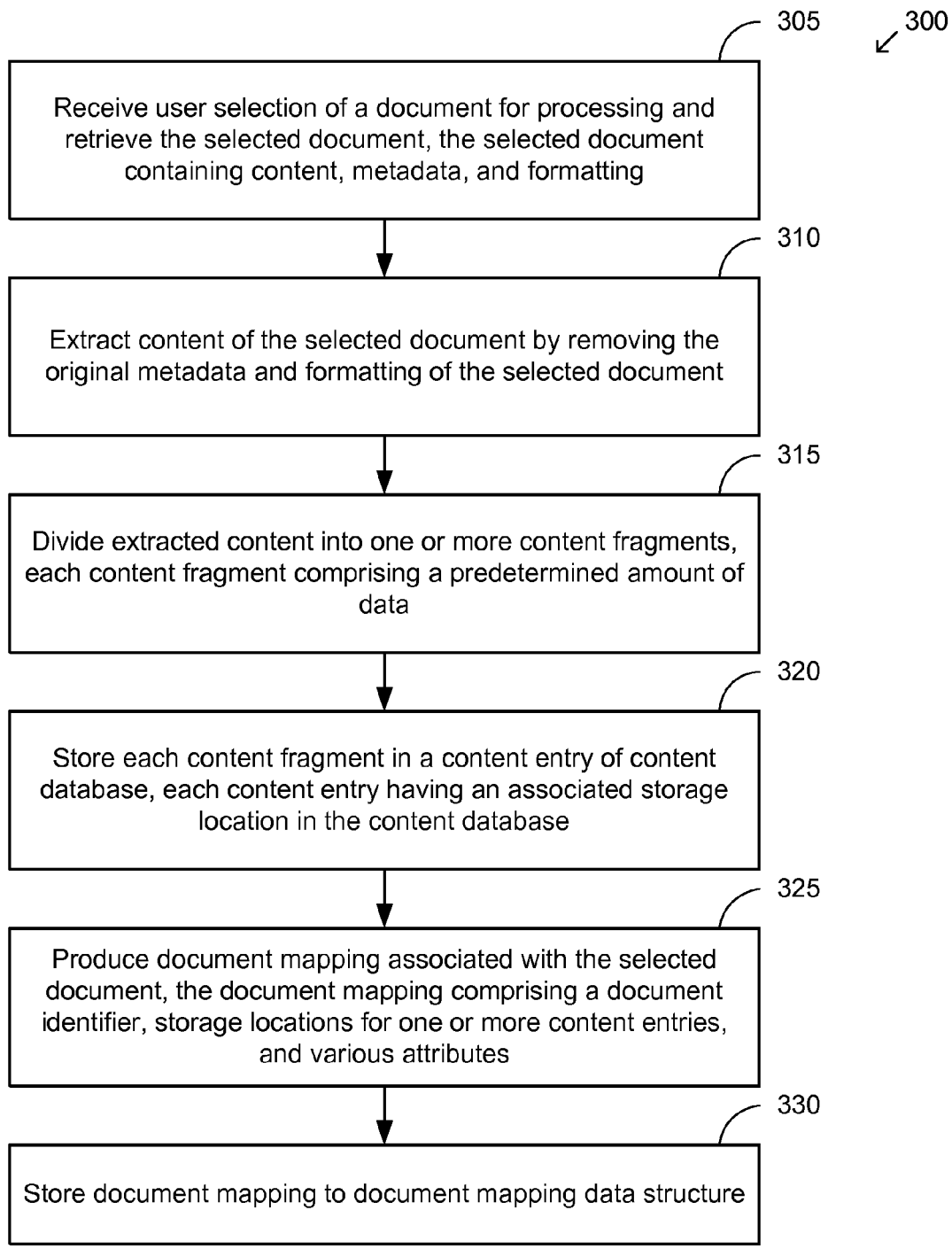
FIG. 3 shows a flowchart of a method for processing a document, in accordance with some embodiments.

FIG. 3 shows a flowchart of a method 300 for processing a document, in accordance with some embodiments. The method 300 is described in relation to FIGS. 4-5 which conceptually illustrate the steps of the method 300. In some embodiments, the method 300 is performed by the content manager engine 112. The order and number of steps of the method 300 are for illustrative purposes only to demonstrate various operations that may be performed by the content manager engine 112. In other embodiments, however, a different order and/or number of steps may be used.

The method 300 begins by receiving (at 305), through the user interface, a user selection of a document 132 for processing and retrieves the selected document (e.g., from a storage system 110 through use of a file system of the storage operating system). The selected document comprises an original document produced by a document application. As such, the selected document contains content as well as metadata and formatting produced by the document application.

The method 300 then extracts (at 310) content of the selected document. The method may do so by removing the original metadata of the selected document. In general, the original metadata may comprise metadata that describes the selected document, but does not comprise content of the selected document. For example, the removed original metadata may comprise a filename, a timestamp, and/or other file attributes. In other embodiments, the original metadata includes other file metadata produced by the document application.

The method may also remove (at 310) the original formatting of the selected document. In general, original formatting is typically proprietary in nature and may comprise reserved metadata that is specific to a proprietary document application for allowing the selected document to be accessible to the document application. Examples of different proprietary file formats include Microsoft® Word® (DOC), Corel® WordPerfect® (WPD), Adobe® Reader® (PDF), Microsoft® PowerPoint® (PPT), etc. Original formatting may also be produced by a proprietary operating system to allow for the storing and reading of the document from storage devices. For example, a propriety file system of the Data ONTAP®, UNIX® or Windows® operating systems may produce their own file formatting in documents to allow its file system to read and write the documents to storage devices.

The extracted content may comprise the remaining data of the selected document after the metadata and formatting are removed (at step 310). The extracted content may comprise various types of content, such as text and images. Extracted content for text may comprise text at a character level. Images may comprise an "internal" format that comprises an encoding type of the image, such as Joint Photographic Experts Group (JPEG), Windows bitmap (BMP), Portable Network Graphics (PNG), Graphics Interchange Format (GIF), etc. In some embodiments, the internal encoding formatting of image content is retained, while the remaining "external" formatting relating to the image content is removed.

Then method then divides (at 315) the extracted content into one or more content fragments. A content fragment may comprise a portion of the extracted content, the portion comprising a predetermined amount of data (storage data size). In cases where the data size of the extracted content is equal to or less than the predetermined amount of data, the extracted content comprises a single content fragment and may be referred to herein as simply the extracted content. In most cases, however, the data size of the extracted content is greater than the predetermined amount of data, and the extracted content is divided into a plurality of content fragments.

The method then stores (at 320) each content fragment in a content entry of the content database 135. As such, the content entries of the content database 135 will store only pure extracted content from the documents, without any metadata or formatting. Each content entry will have an associated storage location in the content database 135. For example, the associated storage location may comprise an address in the content database 135 specified by coordinate positions (such as column and row coordinates). In other embodiments, the storage locations of the content entries are specified using other methods.

Figure 4:
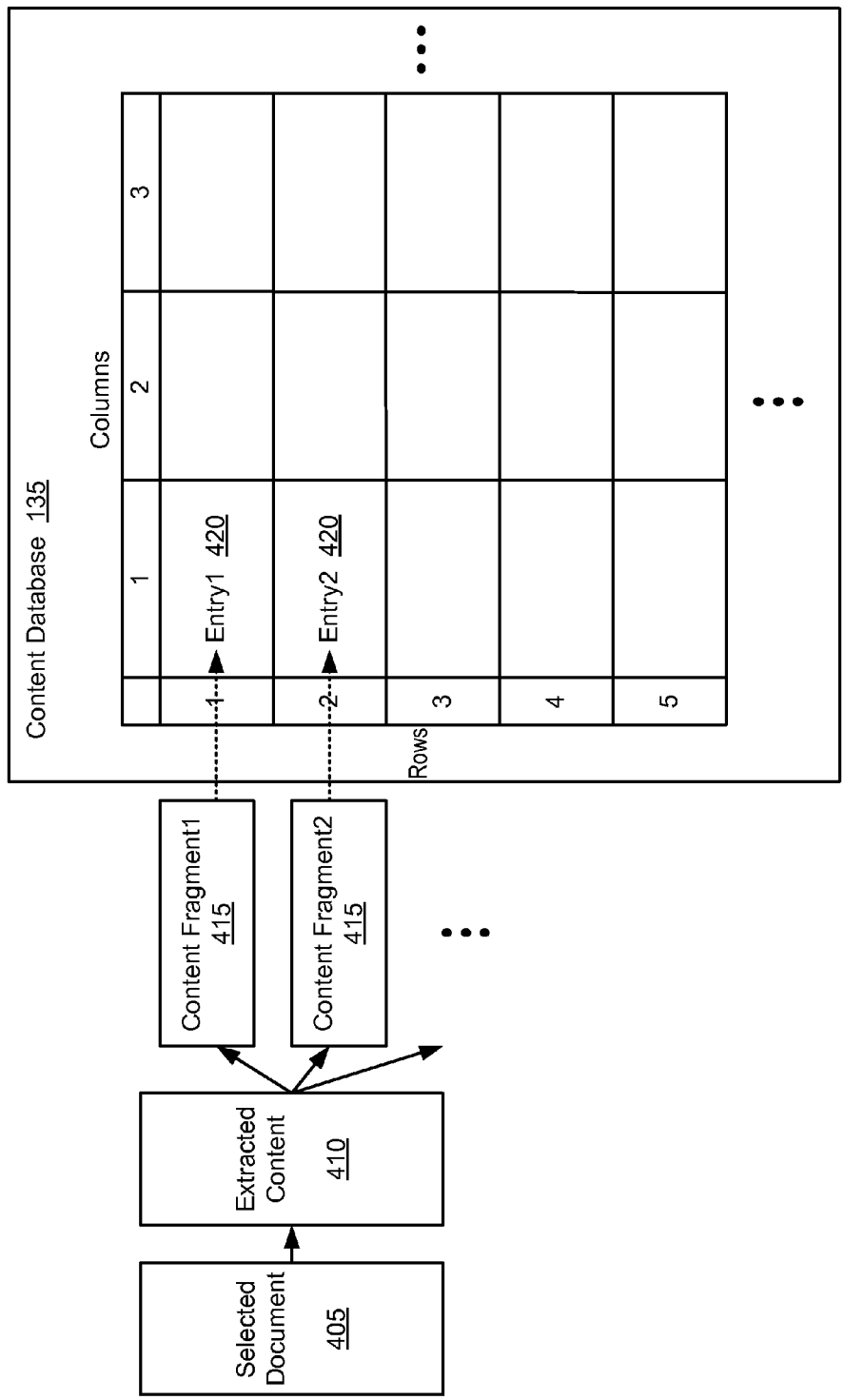
FIG. 4 shows a conceptual illustration of the steps for processing a selected document.

FIG. 4 shows a conceptual illustration of the steps for processing a selected document. As shown in FIG. 4, a selected document 405 is retrieved and its content is extracted to produce extracted content 410. The extracted content 410 is divided into one or more content fragments 415, such as a first content fragment and a second content fragment. Each content fragment 415 is stored as a content entry 420 in the content database 135. For example, the method 300 may store the first content fragment as a first entry and a second content fragment as a second entry in the content database 135. The first entry may be stored at a first storage location and the second entry may be stored at a second storage location in the content database 135. In the example of FIG. 4, the storage locations may be specified by column and row coordinates. In other embodiments, however, the storage locations may be specified in a different manner.

The method then produces (at 325) a document mapping associated with the selected document. The document mapping may comprise a plurality of data fields, including data fields for a document identifier, storage locations for the one or more content entries in the content database, and various mapping attributes. The document mapping may be produced using input received from a user through the user interface. For example, the method 300 may receive the document identifier and/or the various attributes from the user. For example, the document identifier may comprise the original document filename, or another identifier as specified by the user.

The various attributes included in a document mapping may comprise, for example, a brief description, a version number, and/or timestamp. The brief description may describe the content of the selected document. For example, the brief description may specify the topic of the content and/or any topics related to the content. For example, the brief description may specify any storage system services, products, and/or technologies that are the topic and/or related topic of the content. The brief description may be received from a user through the user interface. The brief description may be used by administrators for determining future use of the document mapping. For example, the brief description may be used to determine whether the document mapping should be included in a group mapping or a solution mapping (as discussed below). The version number may comprise the version number of the document mapping. The version number may be automatically incremented by the method 300 when a document mapping or its content entries are updated. The timestamp may comprise the time and day the current version of the document mapping was produced. In other embodiments, the document mapping may include other types of attributes.

In the document mapping, the storage locations for the one or more content entries in the content database 135 comprise the storage locations of the one or more content entries that stores the one or more content fragments in step 320. As such, the document mapping may specify a document identifier that maps to one or more content entries in the content database. The document mapping may be used later to produce a new document that comprises a deconstructed version of the selected document, without the metadata or formatting of the selected document (as discussed below). In some embodiments, the document mapping also specifies an ordering of the content entries in the content database 135. When later producing the new document based on the document mapping, the ordering specifies the order/sequence in which the content fragments stored in the content entries are inserted into the new document. As such, the document mapping also specifies an ordering of the content fragments in the new document.

The method then stores (at 330) the document mapping to a document mapping DS 115. FIG. 5 shows a conceptual diagram of an exemplary document mapping DS 115. As shown in FIG. 5, the document mapping DS 115 comprises a plurality of document mappings 501. Each document mapping 501 may comprise a plurality of data fields, including data fields for a document identifier 505, storage locations 510 for the one or more content entries in the content database 510, and various mapping attributes 515. The document identifier 505 identifies the associated document, but also comprises an identifier for the document mapping 501. The document mappings 501 may be searched using any of the data fields. For example, the content manager engine 112 may provide a user interface to provide a keyword search of the document identifier 505 or the mapping attributes 515.

The method 300 then ends. The method 300 may be repeated for a plurality of selected documents. As such, a plurality of documents may be processed to populate the content entries of the content database 135. Since the metadata and the formatting of the documents are removed, the plurality of processed documents may comprise a plurality of different document types in any format. As such, the content database 135 provides a repository of extracted/deconstructed content that is accessible to users without requiring installation and use of the wide variety of document applications that would otherwise be needed to access the different document types. In the embodiments below, the content entries of the content database 135 may be accessed to produce new documents, modify content entries, and documents of different document types.

B. Producing a New Document Using a Document Mapping

The content manager engine 112 may be configured to produce a new document based on a document mapping associated with an original selected document. The new document comprises a deconstructed version of the original selected document, without the metadata or formatting of the original selected document. The new document may also be modified by the user and saved as a document file to a file system. The content manager engine 112 may provide a user interface to facilitate the producing, modifying, and saving of the new document, the user interface for displaying screen pages and receiving input from a user.

Figure 6:
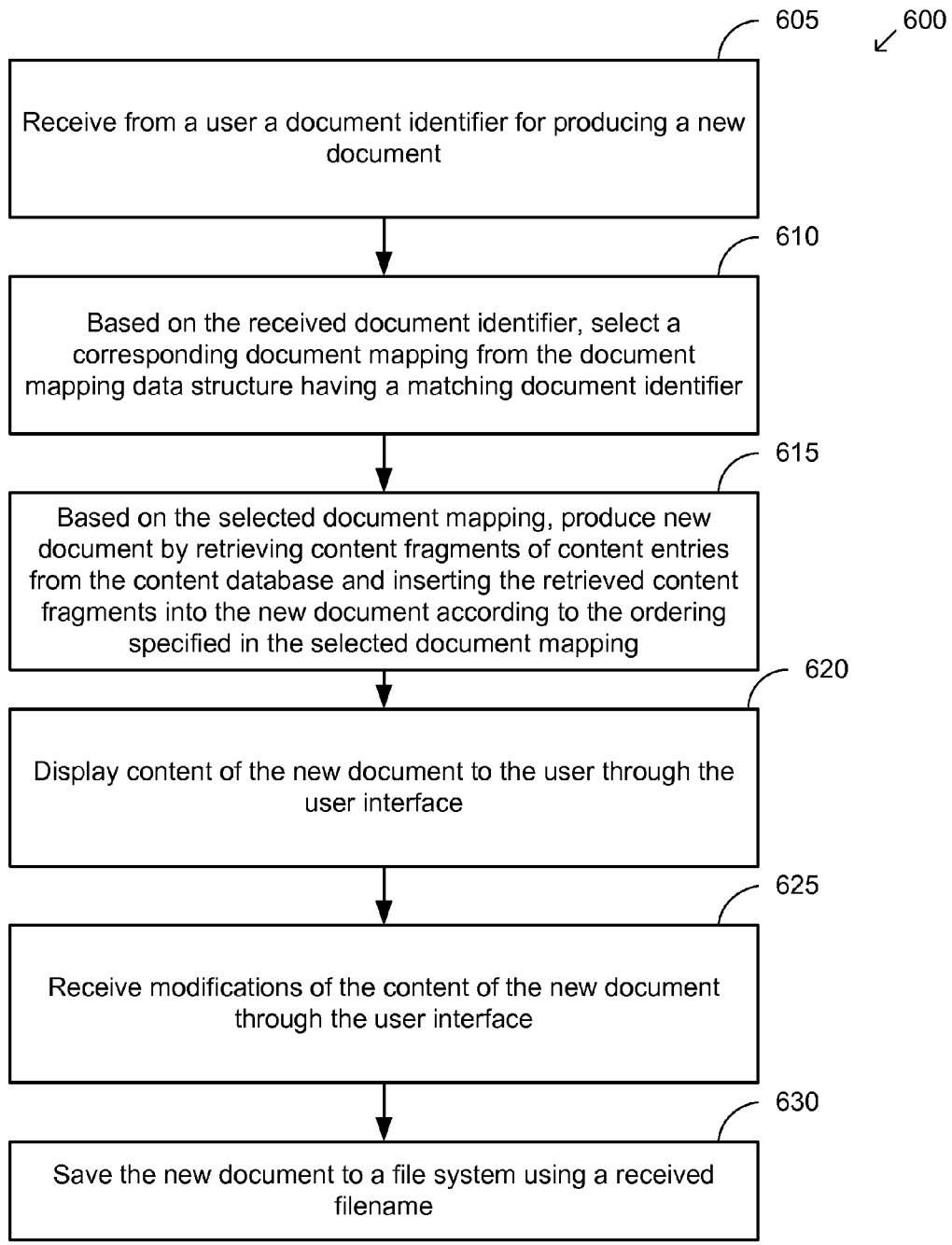
FIG. 6 shows a flowchart of a method for producing a new document using a document mapping.

FIG. 6 shows a flowchart of a method 600 for producing a new document using a document mapping, in accordance with some embodiments. In some embodiments, the method 600 is performed by the content manager engine 112. The order and number of steps of the method 600 are for illustrative purposes only to demonstrate various operations that may be performed by the content manager engine 112. In other embodiments, however, a different order and/or number of steps may be used.

The method 600 begins by receiving (at 605), from a user through the user interface, a document identifier for producing a new document. Based on the received document identifier, the method 600 then selects and retrieves (at 610) a corresponding document mapping 501 from the document mapping DS 115, the corresponding document mapping having a document identifier 505 that matches the received document identifier.

Based on the selected document mapping, the method 600 then produces (at 615) the new document. The method may do so by reading the storage locations 510 for the one or more content entries that are specified in the selected document mapping and retrieving the content fragments stored in the one or more content entries from the content database using the storage locations 510. The method 600 may then insert/incorporate the retrieved content fragments into the new document. In some embodiments, the method 600 inserts the retrieved content fragments into the new document in an order specified by the selected document mapping. For example, as shown in FIG. 5, a document mapping having a document identifier 505 "D2" specifies an ordering of content fragments by specifying the ordering of content entries "E25, E35." As such, a first content fragment (retrieved from a first content entry E25) is inserted in the beginning of the new document and in front of a second content fragment (retrieved from a second content entry E35) in the new document.

The method 600 then displays (at 620) the content of the new document to the user, for example through the user interface. The content of the new document comprises the one or more inserted content fragments. As an optional step, the method 600 may receive (at 625) modifications of the content of the new document through the user interface. Modifications of the content of the new document may include the re-organizing, editing, deletion, and/or adding of content.

The method 600 then saves (at 630) the new document as a file document to a storage device. The saved new document may or may not contain user modifications. The new document may be stored as a document file to a file system of an operating system (such as a storage operating system). The method may receive a filename for the new document from a user through the user interface. In some embodiments, the new document comprises a "deconstructed" document comprising the content of an original document without the metadata or formatting of the original document. In some embodiments, the new document is formatted in a web-based format (e.g., HTML, XML, etc.) for displaying the new document through a web browser application. The method 600 then ends.

C. Merging Document of Different Types into a Single Document

The content manager engine 112 may be configured to merge two documents of different types into a single document by extracting content of the two documents, storing the content to the content database 135 as content entries, and inserting the content into a new document. The content manager engine 112 may provide a user interface to facilitate the merging of documents, the user interface for displaying screen pages and receiving input from a user.

Figure 7:
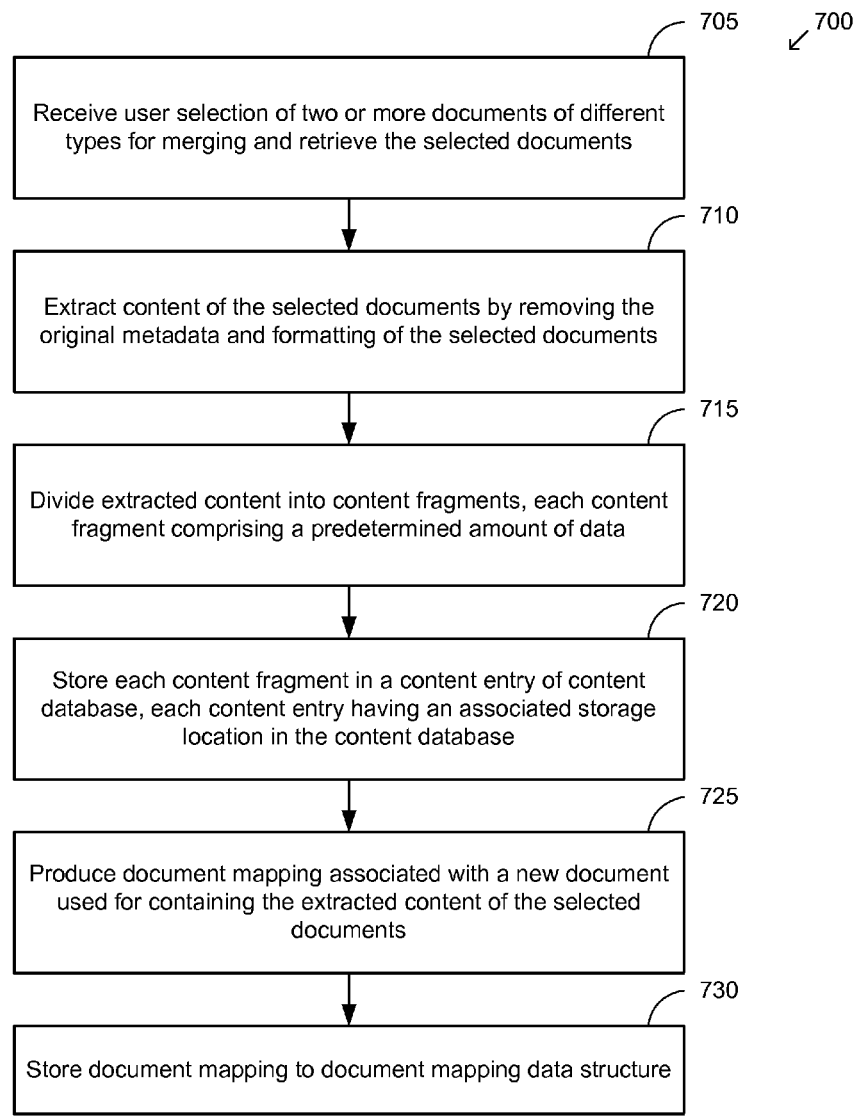
FIG. 7 shows a flowchart of a method for merging documents of different types.

FIG. 7 shows a flowchart of a method 700 for merging documents of different types, in accordance with some embodiments. In some embodiments, the method 700 is performed by the content manager engine 112. The order and number of steps of the method 700 are for illustrative purposes only to demonstrate various operations that may be performed by the content manager engine 112. In other embodiments, however, a different order and/or number of steps may be used.

The method 700 begins by receiving (at 705), through the user interface, a user selection of two or more documents 132 for merging and retrieves the selected documents (e.g., from a storage system 110 through use of a file system of the storage operating system). The two or more selected documents comprise documents of different format types. As such, each selected document may comprise an original document produced by a different document application. For purposes of illustration, as described herein, the selected documents comprise a first document in a first format and a second document in a second format, the first and second formats being different. In other embodiments, the selected documents comprise more than two different document types.

The method 700 then extracts (at 710) content of the selected documents by removing the original metadata and formatting of the selected documents. For example, the method 700 may extract a first content from the first document in the first format by removing metadata and formatting of the first format and extract a second content from the second document in the second format by removing metadata and formatting of the second format.

Then method then divides (at 715) the extracted content into content fragments, each content fragment comprising a predetermined amount of data. For purposes of illustration, as described herein, the extracted content from each selected document comprises a single content fragment and is referred to simply as the extracted content of the selected document. In other embodiments, however, the extracted content from each selected document comprises a plurality of content fragments.

The method 700 then stores (at 720) each content fragment in a content entry of the content database 135, each content entry having an associated storage location in the content database 135. For example, the method 700 may store the first content as a first entry in the content database 135 and store the second content as a second entry in the content database 135.

The method then produces (at 725) a document mapping associated with a new document used for containing the extracted content of the selected documents. The document mapping may comprise a plurality of data fields, including data fields for a document identifier, storage locations for the one or more content entries in the content database, and various mapping attributes. For example, the document mapping may specify a document identifier that maps to the first and second entries in the content database. The method then stores (at 730) the document mapping to a document mapping DS 115. The method 700 then ends.

Note that the document mapping produced at step 725 may be used later to produce the new document using the method 600 of FIG. 6. For example, the method 600 may receive (at 605) a document identifier for producing the new document. The method 600 then selects (at 610) a corresponding document mapping 501 from the document mapping DS 115, the corresponding document mapping having a document identifier 505 that matches the received document identifier. Based on the selected document mapping, the method 600 then produces (at 615) the new document. The method may do so by reading the storage locations 510 for the first and second content entries that are specified in the selected document mapping, and retrieving the first content from the first content entry and the second content from the second content entry of the content database. The method 600 may then insert/incorporate the retrieved first and second content into the new document. In some embodiments, the method 600 inserts the retrieved content fragments into the new document in an order specified by the selected document mapping. For example, the document mapping may specify that the first content be placed before the second content in the new document.

The method 600 then displays (at 620) the first and second content of the new document to the user, for example through the user interface and receives (at 625) modifications of the first and second content of the new document through the user interface. The method 600 then saves (at 630) the new document to a file system. The new document comprises a deconstructed version of the plurality of selected documents, without the metadata or formatting of the plurality of selected documents.

D. Directly Modifying Content Entries

In some embodiments, the content manager engine 112 may also be configured to allow direct modification of content fragments in content entries of the content database (referred to herein as modifying or updating content entries). In these embodiments, modifying a content entry provides automatic updating/modifying of any document mapping, group mapping, or solution mapping using the modified content entry and any subsequent document produced using the modified content entry. This may drastically reduce the amount of modifications needed to be performed on a multitude of mappings and/or documents that may be affected by the modified content fragment. Rather, in these embodiments, only the content fragments would need to be modified in the content database, and all dependent mappings and/or documents would be automatically updated accordingly. The content manager engine 112 may provide a user interface to facilitate the direct modification and storage of content entries in the content database, the user interface for displaying screen pages and receiving input from a user.

Figure 8:
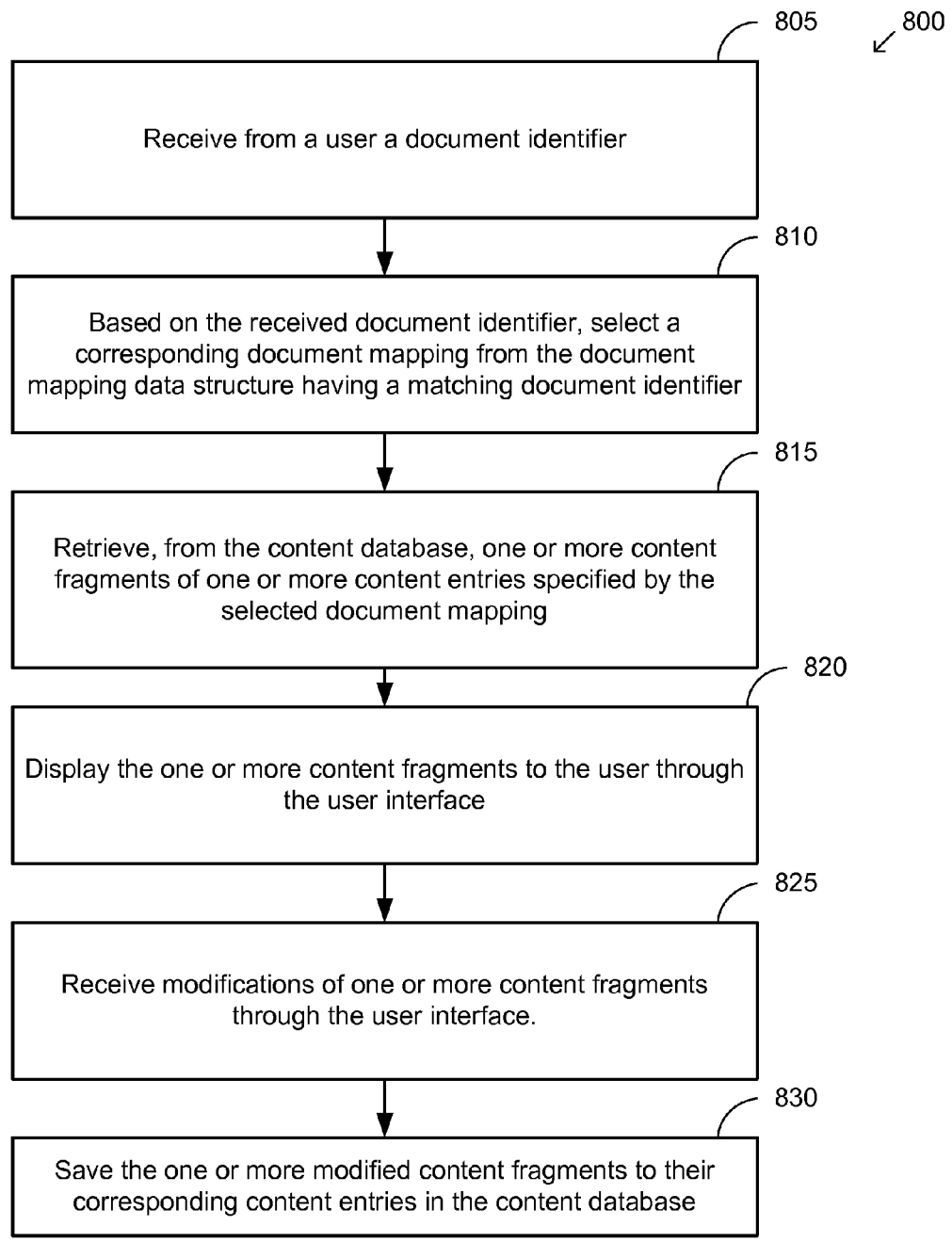
FIG. 8 shows a flowchart of a method for modifying content entries in the content database.

FIG. 8 shows a flowchart of a method 800 for modifying content entries in the content database 135, in accordance with some embodiments. In some embodiments, the method 800 is performed by the content manager engine 112. The order and number of steps of the method 800 are for illustrative purposes only to demonstrate various operations that may be performed by the content manager engine 112. In other embodiments, however, a different order and/or number of steps may be used.

The method 800 begins by receiving (at 805), from a user through the user interface, a document identifier for a document mapping comprising content entries to be modified. Based on the received document identifier, the method 800 then selects (at 810) a corresponding document mapping 501 from the document mapping DS 115, the corresponding document mapping having a document identifier 505 that matches the received document identifier.

The method 800 then retrieves (at 815), from the content database 135, one or more content fragments of one or more content entries specified by the selected document mapping. The method may do so by reading the storage locations 510 for the one or more content entries specified in the selected document mapping and retrieving the content fragments stored in the one or more content entries from the content database using the storage locations 510.

The method 800 then displays (at 820) the one or more content fragments to the user, for example through the user interface. The method 800 then receives (at 825) modifications of one or more content fragments through the user interface. Modifications of a content fragment may include the re-organizing, editing, deletion, and/or adding of the content fragment. The method 800 then saves (at 830) the one or more modified content fragments to their corresponding content entries in the content database 135. The method 800 then ends.

In some embodiments, a corresponding content entry for a content fragment comprises the content entry that previously stored the un-modified content fragment. In these embodiments, a new content entry and/or a new storage location is not used for to store a modified content fragment. As such, each modified content fragment is stored to the same content entry having the same storage location in the content database 135. Thus, any document mapping, group mapping, or solution mapping that are dependent upon and use the modified content entry will be automatically updated/modified since any such dependent mapping will still specify and map to the same storage location, which now contains the modified content fragment. As discussed below, group mappings and solution mappings may be dependent on and use one or more document mappings. Thus, group mappings and solution mappings that are dependent on an updated/modified document mapping are also automatically updated.

Modifying a content entry also provides automatic updating/modifying of any subsequent document produced using a modified document mapping. To produce the document, the modified document mapping is used to retrieve one or more modified content fragments from one or more modified content entries, the modified content fragments being inserted into the document. As such, any subsequent document produced using a modified content entry will be automatic updated to include the modified content fragments.

For example, assume that a first document mapping was already produced using the method 300 of FIG. 3, the first document mapping specifying a first document identifier that maps to first and second content entries in the content database, the first and second content entries storing first and second content fragments, respectively. In accordance with method 800 of FIG. 8, the first content fragment of the first content entry is modified and the modified first content fragment is stored to the same first content entry of the content database. The method 600 of FIG. 6 may then be used to produce a modified document containing the modified first content fragment. For example, the method 600 may receive (at 605) the first document identifier and then retrieve the first document mapping from the document mapping DS 115. Using the first document mapping, the method 600 then produces (at 615) the modified document by retrieving the modified first content fragment from the first content entry and the second content fragment from the second content entry from the content database, and inserting the modified first content fragment and the second content fragment into the modified document.

E. Group Mappings

In some embodiments, a group mapping may be produced to group two or more related document mappings that are associated with two or more related documents. As such, the group mapping may specify a group identifier that maps to two or more related document mappings that are associated with the two or more related documents. Related document mappings and related documents may be determined by an administrator, for example, using the brief descriptions included in the mapping attributes 515 of the document mappings 501 (as shown in FIG. 5). The group mapping may be used to represent a particular overall topic, such as a particular storage system service, product, and/or technology. The related documents of a group mapping may each be relevant to the overall topic of the group mapping and may each be needed to provide a complete description of the overall topic. As such, it may be convenient to group such related documents, and their corresponding related document mappings, as a group mapping. A group mapping may be used to generate a document using the two or more related document mappings. One or more group mappings may be stored to a group mapping DS 120.

FIG. 9 shows a conceptual diagram of an exemplary group mapping DS 120. As shown in FIG. 9, the group mapping DS 120 comprises a plurality of group mappings 901. Each group mapping 901 may comprise a plurality of data fields, including data fields for a group identifier 905, two or more related document identifiers 910, and various mapping attributes 915. The group identifier 905 identifies the topic of the associated grouping, but also comprises an identifier for the group mapping 901.

Each related document identifier 910 comprises a document identifier 505 for a document mapping 501 in the document mapping DS 115. In some embodiments, the group mapping 901 also specifies an ordering of content entries from the content database 135 by specifying an ordering of the two or more related document identifiers 910 of the of the two or more related document mappings 501. When later producing the new document based on the group mapping 901, the ordering specifies the order/sequence in which the content fragments stored in the content entries are inserted into the new document. As such, the group mapping also specifies an ordering of the content fragments in the new document. Different ordering of the content fragments in the new document may be implemented, for example, to improve organization or understanding of the content, to emphasize more important content and less important content, etc.

The various attributes 915 included in a group mapping 901 may comprise, for example, a brief description, a version number, and/or timestamp. For example, the brief description may describe the overall topic associated with the group mapping 901 and the topic of the document associated with each document identifier 910 listed in the group mapping 901. The brief description may be received from a user through the user interface. The brief description may be used by administrators for determining future use of the group mapping. For example, the brief description may be used to determine whether the group mapping should be included in a solution mapping (as discussed below). The version number may comprise the version number of the group mapping. The timestamp may comprise the time and day the current version of the group mapping was produced. In other embodiments, the group mapping may include other types of attributes. The group mapping may be produced using input received from a user through the user interface. For example, the group identifier 905 and/or the various attributes may be received from a user.

The content manager engine 112 may be configured to produce a new document based on a group mapping 901 by using two or more related group mappings 910. The new document may also be modified by the user and saved as a document file to a file system. The content manager engine 112 may provide a user interface to facilitate the producing, modifying, and saving of the new document, the user interface for displaying screen pages and receiving input from a user.

Figure 10:
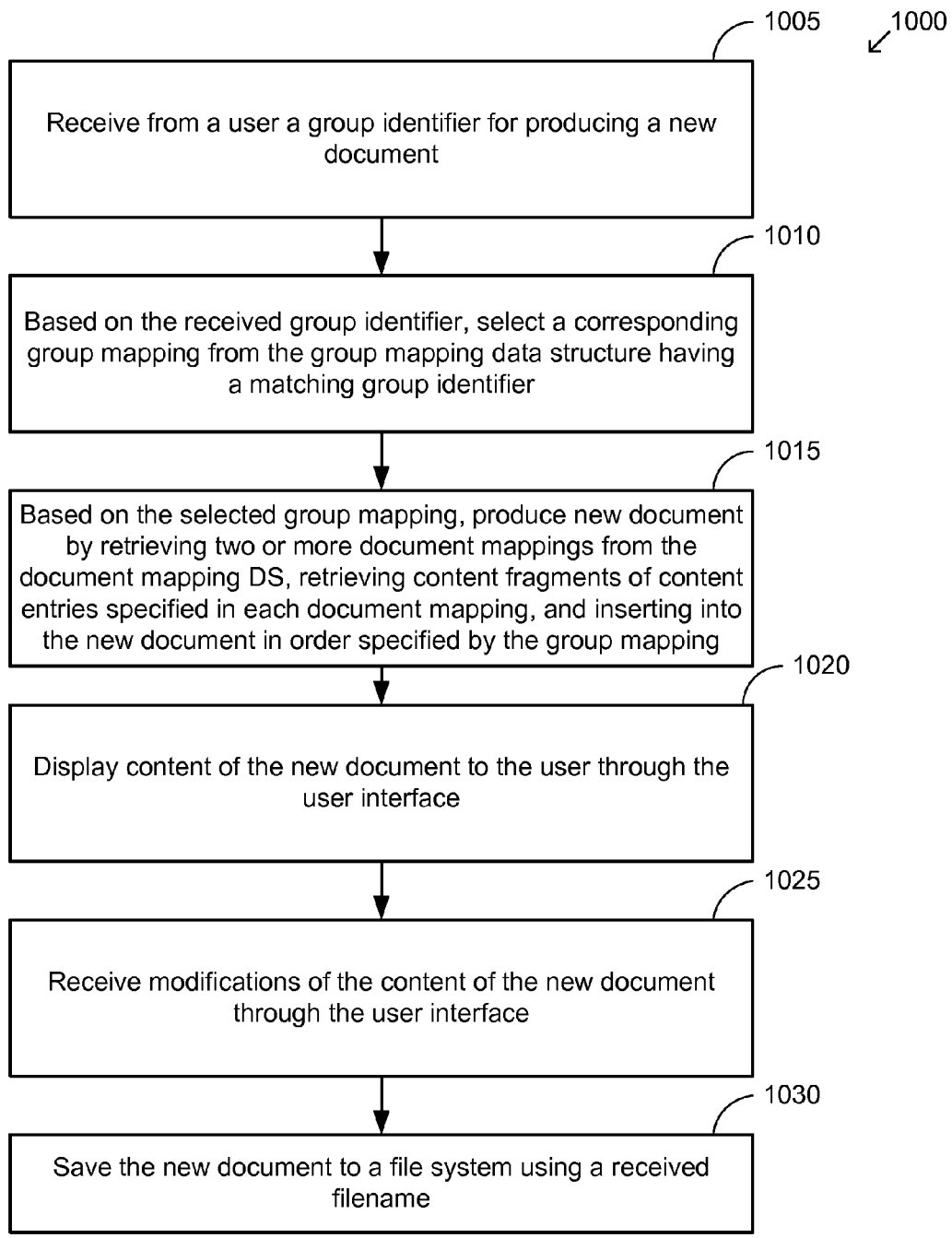
FIG. 10 shows a flowchart of a method for producing a new document using a group mapping.

FIG. 10 shows a flowchart of a method 1000 for producing a new document using a group mapping, in accordance with some embodiments. In some embodiments, the method 1000 is performed by the content manager engine 112. The order and number of steps of the method 1000 are for illustrative purposes only to demonstrate various operations that may be performed by the content manager engine 112. In other embodiments, however, a different order and/or number of steps may be used. Some steps of the method 1000 are similar to steps of the method 600 of FIG. 6 and are not discussed in detail here.

The method 1000 begins by receiving (at 1005), from a user through the user interface, a group identifier 905 for producing a new document. Based on the received group identifier, the method 1000 then selects and retrieves (at 1010) a corresponding group mapping 901 from the group mapping DS 120, the corresponding group mapping having a group identifier 905 that matches the received group identifier.

Based on the selected group mapping 901, the method 1000 then produces (at 1015) the new document. The method may do so by reading the two or more related document identifiers 910 specified in the selected group mapping 901. For each related document identifier 910, the method 1000 may retrieve a corresponding document mapping 501 from the document mapping DS 115, read storage locations 510 for content entries specified in the document mapping 501, retrieve content fragments stored in the content entries from the content database, and insert/incorporate the retrieved content fragments into the new document (as discussed in relation to method 600 of FIG. 6).

In some embodiments, the method 1000 inserts the retrieved content fragments into the new document in an order specified by the selected group mapping 901. In some embodiments, the group mapping 901 specifies an ordering of content entries by specifying an ordering of the two or more related document identifiers 910. The ordering specifies the order/sequence in which the content fragments stored in the content entries are inserted into the new document. For example, as shown in FIG. 9, a group mapping having a group identifier 905 "G2" specifies an ordering of content fragments of content entries by specifying the ordering of related document identifiers 910 "D18, D29, D3." As such, the content fragments of content entries specified by a first document mapping corresponding to document identifier D18 is inserted at the beginning of the new document, the content fragments of content entries specified by a second document mapping corresponding to document identifier D29 is inserted in the middle of the new document, and the content fragments of content entries specified by a third document mapping corresponding to document identifier D3 is inserted at the end of the new document.

The method 1000 then displays (at 1020) the content of the new document to the user, for example through the user interface. As an optional step, the method 1000 may receive (at 1025) modifications of the content of the new document through the user interface. The method 1000 then saves (at 1030) the new document as a file document to a storage device. The saved new document may or may not contain user modifications. The new document may be stored as a document file to a file system of an operating system (such as a storage operating system). In some embodiments, the new document is formatted in a web-based format (e.g., HTML, XML, etc.) for displaying the new document through a web browser application. The method 1000 then ends.

III. Producing Solution Documents Using Content Database

As discussed above, another issue with current storage systems is the inefficient manner used for providing solution documents for clients/users of the storage systems for any issues or queries regarding computer systems the clients/users may have. The solution document may provide a description of how to resolve the client's issue or query. Typically, to provide a solution document to the client, an administrator or engineer is needed to interact with the client to determine their issue or query, determine any storage system services, products, and/or technologies related to the issue or query, identify any documents in the storage system describing these services, products, and/or technologies, modify any of the documents if any of the corresponding services, products, and/or technologies has been recently updated, and produce a solution document for the client that includes the description of the related services, products, and/or technologies. Given that a large number of issues or queries may be received by clients, such a solution process for each issue or query may collectively consume large amounts of time and computer and human resources. As such, there is a need for a more efficient method for providing solution documents for the clients/users.

In some embodiments, the content manager engine 112 may be configured to produce a solution document using the content database 135 based on one or more received user selections. In some embodiments, a solution document may be provided for clients/users for any issues or queries regarding computer systems, such as computer hardware and/or software, storage system hardware and/or software, etc. The solution document may comprise a description of any storage system services, products, and/or technologies related to the client's issue or query, and may also contain any execution steps (such as installation steps, configuring steps, etc.) needed to implement the related services, products, and/or technologies. The solution document may include various types of content, such as text, images (e.g., illustrations, diagrams, flowcharts, etc.), presentation slides, etc.

A. Solution Mappings

In some embodiments, a solution mapping may be produced for mapping one or more received user selections to one or more document mappings and/or one or more group mappings. The document and/or group mappings will then map to content entries having content relevant to the one or more received user selections and comprise a solution document that addresses the user's issue or query. A plurality of solution mappings may be produced to map a wide variety of different user selections and different combinations of user selections to document and/or group mappings.

The document and/or group mappings included in a particular solution mapping may be determined by an administrator, for example, using the brief descriptions included in the mapping attributes 515 of the document mappings 501 (as shown in FIG. 5) and the mapping attributes 915 of the group mappings 901 (as shown in FIG. 9). The solution document produced by a solution mapping may address a particular situation encountered by the user, such as a particular issue or query regarding a storage system service, product, and/or technology. One or more solution mappings may be stored to a solution mapping DS 125.

FIG. 11 shows a conceptual diagram of an exemplary solution mapping DS 125. As shown in FIG. 11, the solution mapping DS 125 comprises a plurality of solution mappings 1101. Each solution mapping 1101 may comprise a plurality of data fields, including data fields for selections/parameters 1105, mapping identifiers 1110, and various mapping attributes 1115. The selections/parameters 1105 may specify any combination of one or more received user selections/parameters for specifying an issue/problem or a query. In other embodiments, the selections/parameters 1105 may also specify one or more received automated selections/parameters for specifying the issue or query. The mapping identifiers 1110 specify one or more document identifiers 505 for one or more document mappings 501. In other embodiments, the mapping identifiers 1110 may also specify one or more group identifiers 905 for one or more group mappings 901.

In some embodiments, the solution mapping 1101 also specifies an ordering of content entries from the content database 135 by specifying an ordering of the mapping identifiers 1110 of the of the document and/or group mappings. When later producing the solution document based on the solution mapping 1101, the ordering specifies the order/sequence in which the content fragments stored in the content entries are inserted into the solution document. As such, the solution mapping also specifies an ordering of the content fragments in the solution document. Different ordering of the content fragments in the solution document may be implemented, for example, to improve organization or understanding of the content, to emphasize more important content and less important content, etc.

The various attributes 1115 included in a solution mapping 1101 may comprise, for example, a brief description, a version number, and/or timestamp. The brief description may describe the general situation and issue or query described by the user and a general description of the solution document for addressing such. The version number may comprise the version number of solution mapping. The timestamp may comprise the time and day the current version of the solution mapping was produced. In other embodiments, the solution mapping may include other types of attributes.

B. Producing a Solution Document Using a Solution Mapping

The content manager engine 112 may be configured to produce a solution document based on one or more user selections using the content database 135. The solution document may also be modified by the user and saved as a document file to a file system. The content manager engine 112 may provide a user interface to facilitate the producing, modifying, and saving of the solution document, the user interface for displaying screen pages and receiving input from a user.

Figure 12:
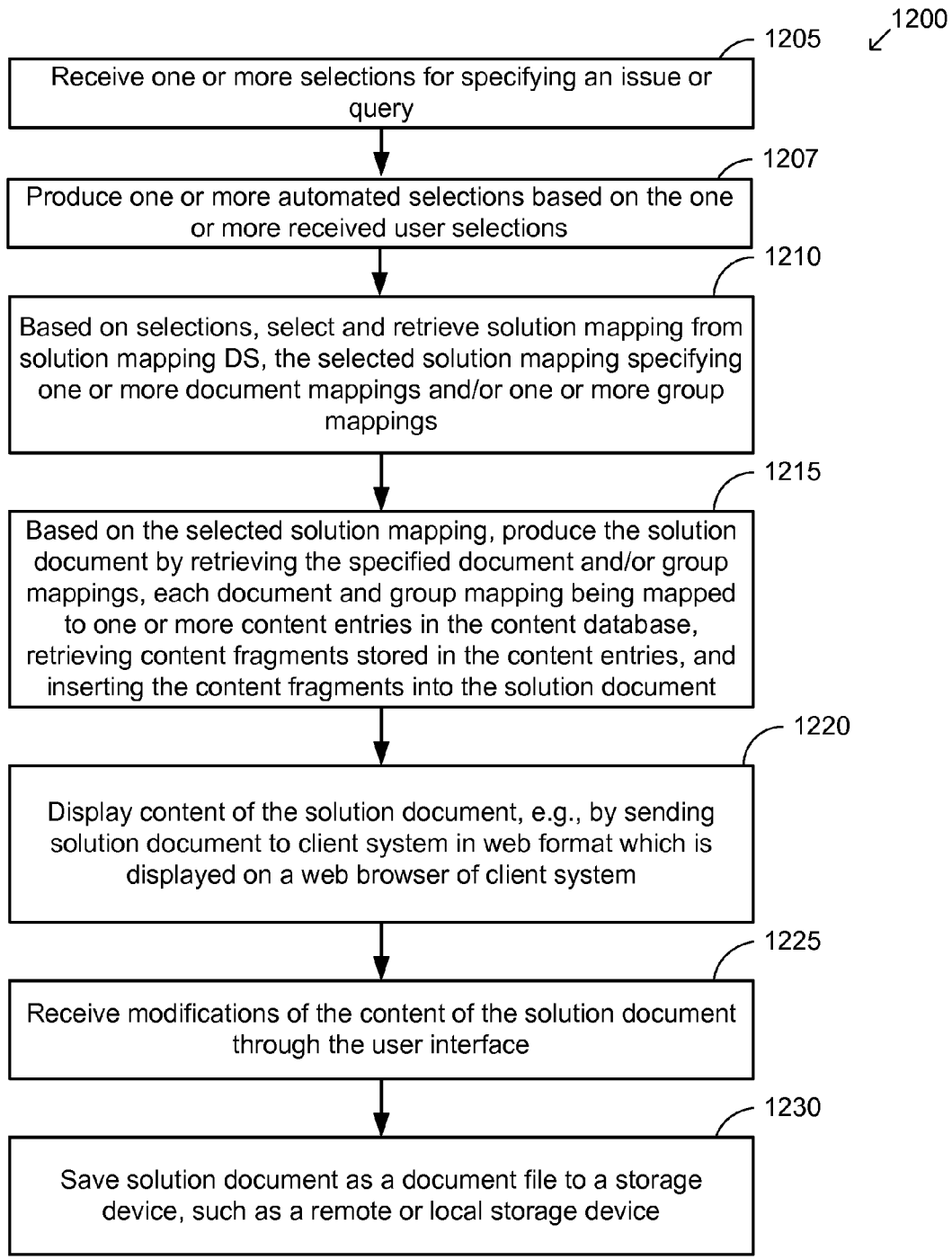
FIG. 12 shows a flowchart of a method for producing a solution document using the content database.

FIG. 12 shows a flowchart of a method 1200 for producing a solution document using the content database, in accordance with some embodiments. In some embodiments, the method 1200 is performed by the content manager engine 112. The order and number of steps of the method 1200 are for illustrative purposes only to demonstrate various operations that may be performed by the content manager engine 112. In other embodiments, however, a different order and/or number of steps may be used. Some steps of the method 1200 are similar to steps of the method 600 of FIG. 6 and are not discussed in detail here.

The method 1200 begins by receiving (at 1205), from a user of a client system through the user interface, one or more selections/parameters for specifying an issue/problem or a query regarding computer hardware and/or software, such as storage system hardware and/or software. The content manager engine 112 may provide a user interface for displaying one or more user-selectable selections/parameters and for receiving the selections from the client/user. For example, the user may interact with a client system 160 that executes a web browser 162 for interfacing/interacting, via a network, with the content manager engine 112 executing on a server 110. In these embodiments, the web browser 162 may be used to receive and display the user interface from the content manager engine 112, receive one or more selections from the user, and submit the one or more selections/parameters to the content manager engine 112.

As an optional step, the method 1200 then produces (at 1207) one or more automated selections/parameters based on the one or more received user selections. The content manager engine 112 may be configured to determine additional selections/parameters for specifying an issue or query by using the received user selections. In these embodiments, the user interface of the content manager engine 112 may display simplified "higher-level" options/parameters to the user and automatically determine detailed "lower-level" options/parameters. As such, the user may need to only select a few higher-level options while the method 1200 automatically fills in and produces one or more lower-level options.

Based on the one or more received user and/or automated selections, the method 1200 then selects and retrieves (at 1210) a corresponding solution mapping 1101 from the solution mapping DS 125. In other embodiments, the method 1200 selects the corresponding solution mapping 1101 based on one or more received user selections and/or one or more automated selections. The corresponding solution mapping 1101 comprises a combination of selections 1105 that matches the one or more received user selections. In other embodiments, the corresponding solution mapping 1101 comprises a combination of selections 1105 that matches the one or more received user selections and the one or more automated selections. The selected solution mapping 1101 comprises a data field for mapping identifiers 1110 that specifies one or more document identifiers 505 for one or more document mappings 501 in the document mapping DS 115 and/or one or more group identifiers 905 for one or more group mappings 901 in the group mapping DS 120.

Based on the selected solution mapping 1101, the method 1200 then produces (at 1215) the solution document. The method may do so by reading the one or more document identifiers 505 and/or one or more group identifiers 905 specified in the selected solution mapping 1101. For each document identifier 505 specified in the selected solution mapping 1101, the method 1200 may retrieve a corresponding document mapping 501 from the document mapping DS 115, read storage locations 510 for content entries specified in the document mapping 501, retrieve content fragments stored in the content entries from the content database, and insert/incorporate the retrieved content fragments into the solution document (as discussed in relation to method 600 of FIG. 6). For each group identifier 905 specified in the selected solution mapping 1101, the method 1200 may retrieve a corresponding group mapping 901 from the group mapping DS 120. For each document identifier 505 specified in the group mapping 901, the method 1200 may retrieve a corresponding document mapping 501 from the document mapping DS 115, read storage locations 510 for content entries specified in the document mapping 501, retrieve content fragments stored in the content entries from the content database, and insert/incorporate the retrieved content fragments into the solution document.

In some embodiments, the method 1200 inserts the retrieved content fragments into the solution document in an order specified by the selected solution mapping 1101. In some embodiments, the solution mapping 1101 specifies an ordering of content entries by specifying an ordering of the one or more document and/or group identifiers for one or more document and/or group mappings. The ordering specifies the order/sequence in which the content fragments stored in the content entries are inserted into the solution document.

The method 1200 then displays (at 1220) the content of the solution document to the user, for example through the user interface. In some embodiments, the method 1200 may do so by sending the solution document to the client system 160, the solution document formatted in a web-based format (such as HyperText Markup Language (HTML), EXtensible Markup Language (XML), etc.) for displaying on a web browser 162 executing on the client system. In these embodiments, a client system would only require a web browser 162 to access the functions of the content manager engine 112 and receive solution documents, without having to locally install and execute the content manager engine 112 on the client system, and without requiring a file download of the solution document.

As an optional step, the method 1200 may receive (at 1225) modifications of the content of the solution document through the user interface. The method 1200 then saves (at 1230) the solution document as a file document to a storage device, such as a remote or local storage device. The saved solution document may or may not contain user modifications. In some embodiments, the solution document may be stored as a document file to a file system of a storage system. As such, the client system may access and modify the solution document via a network connection with the content manager engine 112 using only the web browser, the solution document being stored to a remote storage system. In other embodiments, the solution document may be downloaded to the client system and stored as a document file to a local storage device. The method 1200 then ends.

C. Example of Producing a Solution Document Using a Solution Mapping

Figure 13:
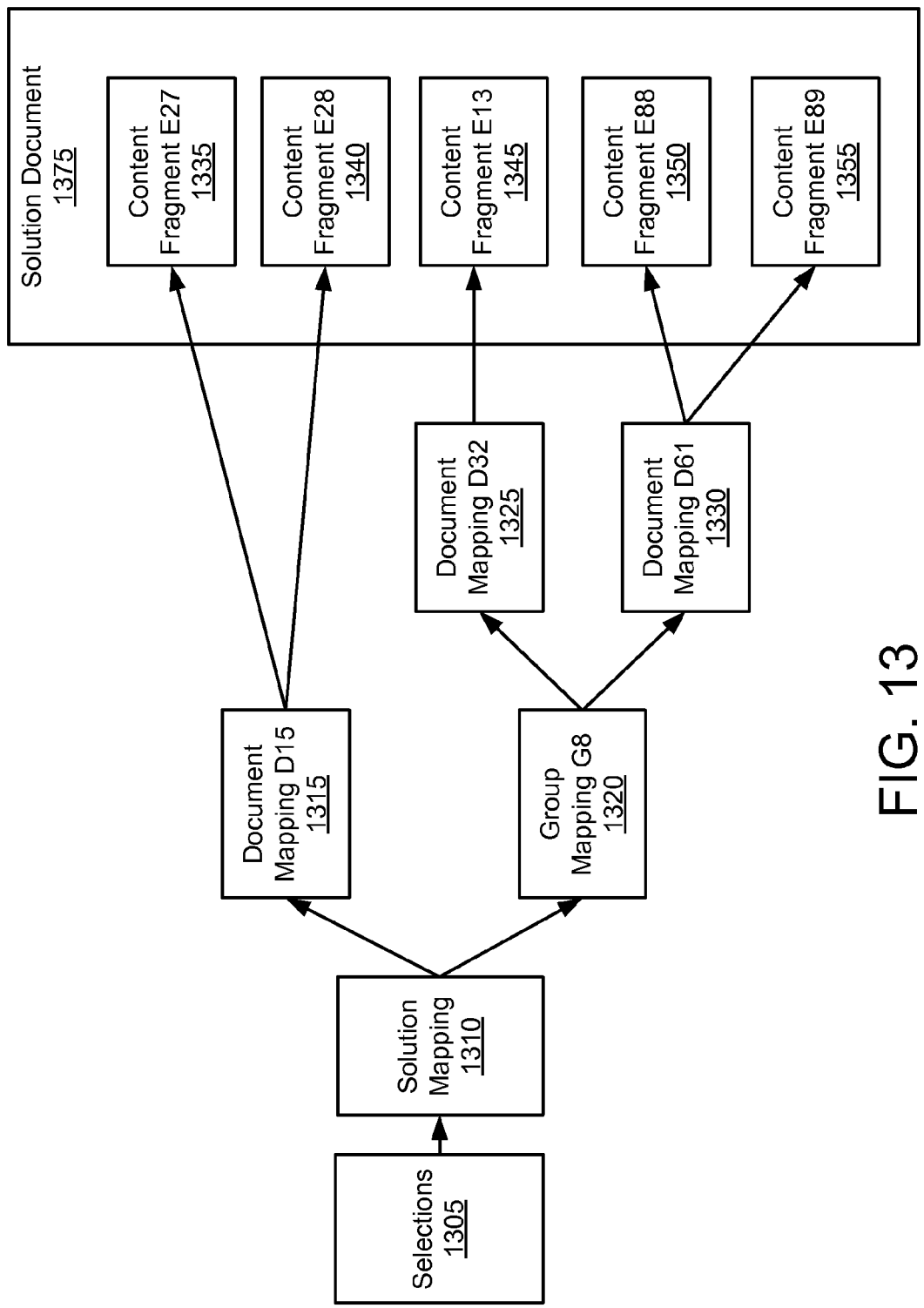
FIG. 13 is a diagram that conceptually illustrates exemplary steps of the method of FIG. 12.

FIG. 13 is a diagram that conceptually illustrates exemplary steps of the method 1200 of FIG. 12. As shown in FIG. 13, a set of one or more user and/or automated selections 1305 are received from a user or produced by the method 1200. The set of selections 1305 are used to select and retrieve a corresponding solution mapping 1310 from the solution mapping DS 125. The corresponding solution mapping 1310 comprises a combination of selections 1105 that matches the set of selections 1305. In the example of FIG. 13, the set of selections 1305 comprises selections "S1, S2, S3."

The corresponding solution mapping 1310 specifies one or more document identifiers 505 for one or more document mappings 501 in the document mapping DS 115 and/or one or more group identifiers 905 for one or more group mappings 901 in the group mapping DS 120. As shown in the example of FIG. 11, the solution mapping 1310 corresponding to selections "S1, S2, S3" specifies a document identifier "D15" for document mapping "D15" 1315 and a group identifier "G8" for group mapping "G8" 1320. For example, the document mapping "D15" 1315 may map to a content entry "E27" storing a content fragment "E27" 1335 and a content entry "E28" storing a content fragment "E28" 1340. For example, the group mapping "G8" 1320 may specify document identifier "D32" for document mapping "D32" 1325 and document identifier "D61" for document mapping "D61" 1330. For example, the document mapping "D32" 1325 may map to a content entry "E13" storing content fragment "E13" 1345.

For example, the document mapping "D61" 1330 may map to a content entry "E88" storing a content fragment "E88" 1350 and a content entry "E89" storing a content fragment "E89" 1355.

The method 1200 then produces a solution document 1375 by retrieving content fragments from the content database 135 from each mapped content entry of each document and/or group mapping specified in the corresponding solution mapping 1310. The method 1200 then inserts the retrieved content fragments into the solution document 1375 based on an ordering specified in the corresponding solution mapping 1310. In the example of FIG. 13, the corresponding solution mapping 1310 specifies an ordering of content fragments mapped from document mapping "D15" 1315 followed by content fragments mapped from group mapping "G8" 1320. As such, the method 1200 incorporates the content fragments into the solution document 1375 in an order from beginning to end: content fragment "E27" 1335, content fragment "E28" 1340, content fragment "E13" 1345, content fragment "E88" 1350, and content fragment "E89" 1355.

D. Directly Modifying Content Entries for Solution Documents

As discussed above, the content manager engine 112 may be configured to allow direct modification of content fragments in content entries of the content database 135. This may be especially beneficial for producing solution documents. Solution documents rely on a vast amount of content describing a wide range of services, products, and technologies that are constantly being updated. Typically, any update of a service, product, or technology would potentially affect a large number of future solution documents and would thus require modifying each individual document that contains a description regarding the changed service, product, or technology. This update process may consume large amounts of time and computer and human resources.

By allowing direct modification of content entries in the content database 135 (e.g., using the method 800 of FIG. 8), only the content entries containing the updated content fragments would need to be modified and any affected solution documents would be automatically updated when produced. This is due to the fact that modifying a content entry provides automatic updating/modifying of any solution mapping using the modified content entry and any subsequent solution document produced using the modified content entry.

This may drastically reduce the amount of modifications needed to update solution documents and thus provide more responsive support to users and client systems. In addition, this reduces the time and cost of producing client solutions by re-using the same content and enables high quality and repeatable solutions to be created with less resource and less time. This also reduces variation of designs, thus leading to more consistent quality of solution deployments, increased deployment efficiency, and improved supportability after deployment.

VARIOUS EMBODIMENTS

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The modules, algorithm, techniques, processes, or methods described in connection with embodiments disclosed herein may be embodied directly in computer hardware configured to perform the embodiments disclosed herein, in software executed by a processor, or in a combination of the two. In some embodiments, any software application, program, tool, module, or layer described herein may comprise an engine comprising hardware, software, or a combination of the two configured to perform embodiments described herein. In general, functions of a software application, program, tool, module, or layer described herein may be embodied directly in hardware, or embodied as software executed by a processor, or embodied as a combination of the two.

A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A method for producing solution documents, the method comprising:
    receiving, from a client system, at least one selection for specifying an issue or query regarding a computer system;
    selecting a first solution mapping from a plurality of solution mappings based on the at least one received selection, the first solution mapping specifying a plurality of document mappings, wherein (1) each of the plurality of solution mappings is associated with at least one document mapping and a set of content fragments, and (2) at least some of the plurality of solution mappings are associated with existing solution documents;
    retrieving one or more content fragments associated with each of the plurality of document mappings from a content database, wherein (1) the plurality of document mappings refers to at least a first document encoded in a first format and a second document encoded in a second format, and (2) at least one of the first and second formats is incompatible with the client system;
    producing a solution document in a format compatible with the client system, the solution document including at least the one or more content fragments; and
    providing the solution document to the client system, the solution document comprising at least some modifiable content pertaining to the selected issue or query;
    receiving, from the client system, modifications to at least one content fragment in the solution document;
    updating the at least one modified content fragment in the content database; and
    producing new solution documents to replace the existing solution documents for each of the plurality of solution mappings with one of the modified content fragments in its set of content fragments.

2. The method of claim 1, wherein:
    the first solution mapping specifies an ordering of the one or more content fragments in the solution document; and
    the solution document comprises the one or more content fragments in the ordering specified in the first solution mapping.

3. The method of claim 1, wherein the first solution mapping further specifies a first group mapping, the method further comprising:
    retrieving the first group mapping from a group mapping data structure, the first group mapping specifying second and third document mappings;
    retrieving a second content fragment associated with the second document mapping from the content database;
    retrieving a third content fragment associated with the third document mapping from the content database; and
    inserting the second and third content into the solution document.

4. The method of claim 3, wherein:
    the first group mapping maps to content for an overall topic; and
    the second and third document mappings each map to content for a sub-topic of the overall topic.

5. The method of claim 3, wherein:
    the first document mapping and the first group mapping each comprise a data field for a description of the mapping; and
    the first document mapping and the first group mapping are included in the first solution mapping based on the descriptions.

6. The method of claim 1, wherein:
    the content database comprises a plurality of entries, each entry for storing content related to computer system services, products or technologies; and
    the solution document comprises content regarding computer system services, products or technologies related to the specified issue or query.

7. The method of claim 1, further comprising:
    sending the solution document to the client system in a web-based format for displaying on a web browser executing on the client system.

8. The method of claim 1, further comprising:
    producing at least one automated selection based on the at least one received selection, wherein the first solution mapping is further selected based on the at least one automated selection.

9. A system for producing a-solution documents, the system comprising:
    a memory resource to store instructions;
    one or more processors; and
    a content manager engine to use the one or more processors and the instructions stored in the memory resource for:
    receiving, from a client system, at least one selection for specifying an issue or query regarding a computer system;

selecting a first solution mapping from a plurality of solution mappings based on the at least one received selection, the first solution mapping specifying a plurality of document mappings, wherein (1) each of the plurality of solution mappings is associated with at least one document mapping and a set of content fragments, and (2) at least some of the plurality of solution mappings are associated with existing solution documents;

retrieving one or more content fragments associated with each of the plurality of document mappings from a content database, wherein (1) the plurality of document mappings refers to at least a first document encoded in a first format and a second document encoded in a second format, and (2) at least one of the first and second formats is incompatible with the client system;

producing a solution document in a format compatible with the client system, the solution document including at least the one or more content fragments;

providing the solution document to the client system, the solution document comprising at least some modifiable content pertaining to the selected issue or query;

receiving, from the client system, modifications to at least one content fragment in the solution document;

updating the at least one modified content fragment in the content database; and producing new solution documents to replace the existing solution documents for each of the plurality of solution mappings with one of the modified content fragments in its set of content fragments.

10. The system of claim 9, wherein:

the first solution mapping specifies an ordering of the one or more content fragments in the solution document; and the solution document comprises the one or more content fragments in the ordering specified in the first solution mapping.

11. The system of claim 9, wherein the first solution mapping further specifies a first group mapping, the content manager engine using further instructions for:

retrieving the first group mapping from a group mapping data structure, the first group mapping specifying second and third document mappings;

retrieving a second content fragment associated with the second document mapping from the content database;

retrieving a third content fragment associated with the third document mapping from the content database; and inserting the second and third content into the solution document.

12. The system of claim 11, wherein:

the first group mapping maps to content for an overall topic; and the second and third document mappings each map to content for a sub-topic of the overall topic.

13. The system of claim 11, wherein:

the first document mapping and the first group mapping each comprise a data field for a description of the mapping; and the first document mapping and the first group mapping are included in the first solution mapping based on the descriptions.

14. The system of claim 9, wherein:

the content database comprises a plurality of entries, each entry for storing content related to computer system services, products or technologies; and the solution document comprises content regarding computer system services, products or technologies related to the specified issue or query.

15. The system of claim 9, wherein the content manager engine is further configured for:

sending the solution document to the client system in a web-based format for displaying on a web browser executing on the client system.

16. The system of claim 9, wherein the content manager engine uses further instructions for:

producing at least one automated selection based on the at least one received selection, wherein the first solution mapping is further selected based on the at least one automated selection.

\* \* \* \* \*